United States Patent
Moore et al.

[11] 3,730,639
[45] May 1, 1973

[54] FAN OR COMPRESSOR FOR A GAS TURBINE ENGINE

[75] Inventors: Christopher John Moore, Mickleover; Brian Barry, Duffield, both of England

[73] Assignee: The Secretary of State for Defence in Her Britannic Majesty's Government of the United Kingdom of Great Britain and Northern Ireland, London, England

[22] Filed: July 16, 1971

[21] Appl. No.: 163,210

[30] Foreign Application Priority Data

July 17, 1970 Great Britain..................34,728/70

[52] U.S. Cl.................415/119, 415/144, 415/DIG. 1
[51] Int. Cl......F01d 25/04, F04d 29/66, F04d 29/68
[58] Field of Search.......................415/DIG. 1, 144, 415/119, 145

[56] References Cited

UNITED STATES PATENTS

| | | | |
|---|---|---|---|
| 2,689,682 | 9/1954 | Boyd et al. | 415/144 |
| 2,958,456 | 11/1960 | Forshaw | 415/144 |
| 2,709,917 | 6/1955 | Bruynes | 415/DIG. 1 |
| 2,887,957 | 5/1959 | Stalker | 415/144 |
| 3,142,438 | 7/1964 | McKenzie | 415/144 |
| 3,203,180 | 8/1965 | Price | 415/144 |
| 3,597,106 | 8/1971 | Anderson | 415/144 |
| 3,632,223 | 1/1972 | Hampton | 415/144 |

FOREIGN PATENTS OR APPLICATIONS

| | | | |
|---|---|---|---|
| 722,424 | 7/1942 | Germany | 415/144 |

Primary Examiner—Henry F. Raduazo
Attorney—Cushman, Darby & Cushman

[57] ABSTRACT

The noise generated by a fan is to be largely due to the blade tips passing the turbulent boundary layer which is attached to the duct wall.

The present invention provides a slot positioned immediately upstream of the fan, the slot being connected to a duct and means for providing suction in the duct so that the boundary layer is removed and the blade tips pass substantially laminar flow.

3 Claims, 1 Drawing Figure

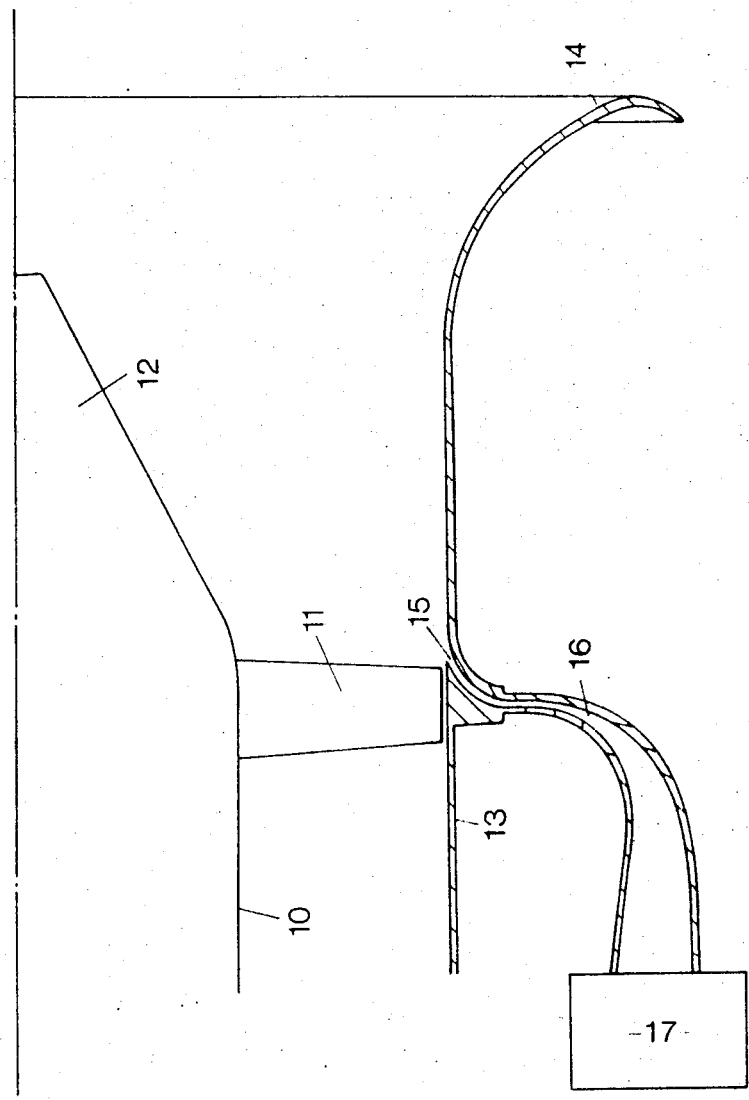

FAN OR COMPRESSOR FOR A GAS TURBINE ENGINE

This invention relates to a fan or compressor for a gas turbine engine.

Recently it has become of utmost importance to reduce the noise produced by the various components of the gas turbine engine. When an aircraft propelled by a gas turbine engine is landing, one the the main components of the noise level produced on the ground is due to the noise from the early stages of the low pressure compressor or the fan. We have proved that a large percentage of this noise, particularly in the case where the first stage of the compressor or fan has no inlet guide vanes, is caused by interaction between the blade tips and the turbulent boundary layer on the duct wall.

The present invention provides a fan or compressor in which this source of noise is reduced or substantially eliminated.

According to the present invention a fan or compressor for a gas turbine engine comprises a rotor having at least one row of blades adapted to rotate within a duct, the duct having a slot therein adapted to remove sufficient of the turbulent boundary layer from the duct surface so that in operation the blade tips do not pass through the turbulent boundary layer.

In a preferred embodiment the duct is an annular duct and the rotor axis coincides with the duct axis so that the blade tips pass in close proximity to the duct wall over the complete circumference. In this case the slot is preferably a fully annular slot positioned just ahead of the leading edge of the blades.

In order to achieve the necessary removal of the boundary layer it may be necessary to apply suction to the slot.

Greatest benefit is to be expected from the invention when it is applied to the first stage of compression of the engine, and where there are no inlet guide vanes upstream of the rotor. Thus, the invention is particularly applicable to a single stage fan without inlet guide vanes.

The invention will now be particularly described merely by way of example with reference to the accompanying drawing which is a sectional view through a fan for a gas turbine engine in accordance with the invention. The drawing shows a fan comprising a rotor shaft 10 from which is mounted a single row of rotor blades 11. Upstream of the blades 11 there extends an intake bullet 12 which serves to smoothly divert the airflow into the fan annulus.

The rotor is concentrically mounted within a substantially annular duct 13 having a bell-mouthed intake portion 14, and the fan blades 11 are arranged to that their tips clear the inner surface of the fan duct 13 by a small clearance.

Just upstream of the fan blades 11 the fan duct 13 is broken by a fully annular slot 15. The slot 15 feeds into a manifold 16 which divides the fully annular flow into a plurality of discrete flows which are then connected to a suction device 17.

Operation of the device is as follows: Assuming that the slot 15 were not present, when the fan blades rotate the blade clearance from the inner surface of the fan duct is such that the fan tips are running within the area of turbulent boundary layer of the fan duct. In this condition the fan tips produce a considerable amount of noise, this noise being made up of a white noise component caused by interaction of the blade tips and the general turbulence of the boundary layer, and components of multiples of blade-passing frequency which are caused by interactions between the blade tips and larger scale irregularities in the boundary layer.

In order to eliminate or at least reduce this source of noise the slot 15 is positioned and sized so that it removes the boundary layer from the fan wall to such a degree that the boundary layer has not sufficiently established itself by the time it reaches the fan blades to cause the fan blades to run within the turbulent area. It will be appreciated that this effectively removes this particular source of noise.

In a typical example of a fan rig we found that a fully annular slot should be positioned some 50 millimeters forward of the leading edge of the blade tips, the slot having a radial depth of some 11.5 millimeters. It will be appreciated by those skilled in the art that the dimensions of the slot and the distance of the blade tips will vary with the particular application and in particular will vary with the velocity distribution which is being considered. However, with our test device we found an attenuation of some 8 dB in the higher blade passing frequency harmonic components of the noise of the fan and a slightly smaller reduction in the broad band noise components. We believe that a slight increase in the blade passing frequency is due to slight irregularities in the suction arrangement which must be very carefully arranged to provide removal of boundary layer which is uniform round the circumference of the duct. Furthermore we believe that the reduction in broad band components and engine order components results from the elimination of small scale turbulence whilst the reduction in blade passing harmonics results from minimizing and steadying the large scale turbulence.

Although the invention has been described with reference to a single stage test fan, it will be appreciated that the invention is applicable to virtually any compressor or fan of a gas turbine engine in which the blade tips are likely to run in an area of turbulent boundary layer flow. Thus the first stage of a multi-stage compressor could be silenced to some degree by the present invention, however, in most practical cases multi-stage compressors having inlet guide vanes produce rather more noise from other interactions than that treated by the present invention. Therefore, the full benefit of the present invention is only to be achieved in a single stage fan which has no inlet guide vanes.

Again although the invention has been described in relation to a fan running in an annular duct, the invention would be applicable to other shapes of duct. Thus, should it require to operate with a non-annular duct it would only be necessary to remove the boundary layer from this area within which the fan blade tips are running in the turbulent boundary layer.

Although the embodiment described used a suction device to remove the boundary layer it is possible hat this could be removed by making use of existing low pressure areas to which the slot could be connected, thus avoiding the use of pumps or the like.

We claim:

1. A fan or compressor for a gas turbine engine comprising:
   an annular duct having an outer wall;
   a rotor adapted to rotate on the axis of said duct;
   at least one row of blades mounted on said rotor for rotation within said duct, said row of blades having blade tips which pass in close proximity to said duct outer wall,
   said outer wall of said duct extending upstream of said at least one row of blades and said duct being completely unobstructed upstream of said at least one row of blades;
   means for reducing noise caused by the turbulent boundary layer and blade interaction therewith, said means comprising:
   an annular slot located in said outer wall of said duct immediately upstream of said at least one row of blades,
   said annular slot being arranged to remove a sufficient amount of turbulent boundary layer from the surface of said duct outer wall upstream of said blades so there is no boundary layer turbulence in the proximity of the blade tips when said rotor is rotating.

2. A fan or compressor as claimed in claim 1 including suction means operatively connected to said annular slot for assisting in removal of turbulent boundary layer from the surface to said outer wall upstream of the blades.

3. A fan or compressor as claimed in claim 1 which is a single stage fan without inlet guide vanes.

* * * * *